US010175666B2

(12) United States Patent
Baez et al.

(10) Patent No.: US 10,175,666 B2
(45) Date of Patent: Jan. 8, 2019

(54) MANAGING INTERNET OF THINGS COLLECTION HAVING DIFFERENT CAPABILITIES

(71) Applicant: INTERNATIONAL BUSINESS MACHINES CORPORATION, Armonk, NY (US)

(72) Inventors: Jon A. Baez, Durham, NC (US); Andrew R. Freed, Cary, NC (US); Niraj P. Joshi, Cary, NC (US); Jack P. Yapi, Knightdale, NC (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 14/928,752

(22) Filed: Oct. 30, 2015

(65) Prior Publication Data

US 2017/0123389 A1 May 4, 2017

(51) Int. Cl.
| | | |
|---|---|---|
| G05B 15/02 | (2006.01) | |
| H04W 8/00 | (2009.01) | |
| H04W 4/00 | (2018.01) | |
| H04L 12/28 | (2006.01) | |
| H04W 4/70 | (2018.01) | |
| H04W 8/22 | (2009.01) | |

(52) U.S. Cl.
CPC .......... *G05B 15/02* (2013.01); *H04L 12/2816* (2013.01); *H04W 4/70* (2018.02); *H04W 8/005* (2013.01); *H04W 8/22* (2013.01)

(58) Field of Classification Search
CPC ...... G05B 15/02; H04W 4/005; H04W 8/005; H04W 4/70; H04W 8/22; H04L 12/2816
See application file for complete search history.

(56) References Cited

U.S. PATENT DOCUMENTS

| 8,355,940 | B2* | 1/2013 | Channabasavaiah | .. G06Q 10/06 705/7.11 |
| 8,595,043 | B2* | 11/2013 | Channabasavaiah | .. G06Q 10/06 705/7.11 |
| 9,461,976 | B1* | 10/2016 | Smith | ...... H04W 4/70 |
| 9,497,572 | B2* | 11/2016 | Britt | .......... G06F 8/36 |
| 9,647,888 | B2* | 5/2017 | Kim | ...... H04L 41/082 |
| 9,800,468 | B2* | 10/2017 | Smith | ...... H04W 4/70 |

(Continued)

FOREIGN PATENT DOCUMENTS

| WO | 2014129966 | 8/2014 |
| WO | 2014131035 | 8/2014 |

*Primary Examiner* — M. N. Von Buhr
(74) *Attorney, Agent, or Firm* — Tutunjian & Bitetto, P.C.; Richard Wilhelm (57) ABSTRACT

A method and system are provided. The method includes determining, by a processor-based capability determining element, different capabilities of each of different devices connected through one or more networks. The different capabilities include communication capabilities and manageability capabilities. The method further includes classifying, by the processor-based capability determining element, the different devices according to capability maturity rankings supported by the different capabilities to provide maturity-based capability classifications for the different devices. The capability maturity rankings are based on capability maturity criteria. The method also includes dynamically managing, by a controller, operations of the different devices in accordance with the maturity-based capability classifications.

20 Claims, 6 Drawing Sheets

(56) References Cited

U.S. PATENT DOCUMENTS

| | | | |
|---|---|---|---|
| 2014/0241354 A1* | 8/2014 | Shuman | H04L 67/16 370/390 |
| 2014/0244768 A1* | 8/2014 | Shuman | H04L 51/32 709/206 |
| 2014/0244833 A1* | 8/2014 | Sharma | H04L 67/16 709/224 |
| 2015/0007273 A1* | 1/2015 | Lin | H04L 63/08 726/4 |
| 2015/0019342 A1* | 1/2015 | Gupta | G06Q 30/0269 705/14.66 |
| 2015/0127733 A1* | 5/2015 | Ding | H04W 4/08 709/204 |
| 2015/0156266 A1* | 6/2015 | Gupta | H04W 4/70 709/224 |
| 2015/0261876 A1* | 9/2015 | Trikha | G06F 17/30896 715/234 |
| 2015/0304411 A1* | 10/2015 | Cheng | H04L 67/16 709/203 |
| 2016/0006815 A1* | 1/2016 | Dong | G06F 9/46 709/204 |
| 2016/0065653 A1* | 3/2016 | Chen | H04L 67/10 715/735 |
| 2016/0105292 A1* | 4/2016 | Choi | H04L 51/02 709/206 |
| 2016/0105376 A1* | 4/2016 | Cvijetic | H04L 47/821 709/224 |
| 2016/0128043 A1* | 5/2016 | Shuman | H04W 72/044 370/331 |
| 2016/0205003 A1* | 7/2016 | Srinivasan | H04L 67/10 709/224 |
| 2016/0226732 A1* | 8/2016 | Kim | H04L 12/2807 |
| 2016/0248847 A1* | 8/2016 | Saxena | H04L 67/18 |
| 2016/0323767 A1* | 11/2016 | Abdullah | H04W 16/18 |
| 2016/0344841 A1* | 11/2016 | Wang | H04W 4/70 |
| 2016/0352732 A1* | 12/2016 | Bamasag | H04L 9/3242 |
| 2016/0364553 A1* | 12/2016 | Smith | G06F 21/105 |
| 2016/0366141 A1* | 12/2016 | Smith | H04L 63/062 |
| 2016/0366181 A1* | 12/2016 | Smith | H04L 63/102 |
| 2017/0093982 A1* | 3/2017 | Shaashua | H04L 67/12 |
| 2017/0311303 A1* | 10/2017 | Ahn | H04W 4/70 |
| 2018/0097651 A1* | 4/2018 | Guedalia | H04W 4/70 |

* cited by examiner

FIG. 6

# MANAGING INTERNET OF THINGS COLLECTION HAVING DIFFERENT CAPABILITIES

BACKGROUND

Technical Field

The present invention relates generally to information processing and, in particular, to managing an Internet of Things collection having different capabilities.

Description of the Related Art

The "Internet of Things" refers to the network of physical objects or "things" that are embedded with and/or otherwise include electronics, software, sensors, and network connectivity that allow these objects to collect and exchange data In the "Internet of Things", sensors/devices of many different types and capabilities are deployed for different purposes. These sensors/devices communicate using different protocols/methods, and require correspondingly different interfaces to manage. The problem is that currently there are different management systems for different types of sensors/devices in networks. Mapping and managing the sensors/devices requires multi-level management systems (sometimes called a manager of managers). These multi-level management systems are unwieldy and hard to adapt to the addition of new types of devices/sensor.

SUMMARY

According to an aspect of the present principles, a method is provided. The method includes determining, by a processor-based capability determining element, different capabilities of each of different devices connected through one or more networks. The different capabilities include communication capabilities and manageability capabilities. The method further includes classifying, by the processor-based capability determining element, the different devices according to capability maturity rankings supported by the different capabilities to provide maturity-based capability classifications for the different devices. The capability maturity rankings are based on capability maturity criteria. The method also includes dynamically managing, by a controller, operations of the different devices in accordance with the maturity-based capability classifications.

According to another aspect of the present principles a computer program product is provided for device management. The computer program product includes a non-transitory computer readable storage medium having program instructions embodied therewith. The program instructions are executable by a computer to cause the computer to perform a method. The method includes determining, by a processor-based capability determining element, different capabilities of each of different devices connected through one or more networks. The different capabilities include communication capabilities and manageability capabilities. The method further includes classifying, by the processor-based capability determining element, the different devices according to capability maturity rankings supported by the different capabilities to provide maturity-based capability classifications for the different devices. The capability maturity rankings are based on capability maturity criteria. The method also includes dynamically managing, by a controller, operations of the different devices in accordance with the maturity-based capability classifications.

According to yet another aspect of the present principles, a system is provided. The system includes a processor-based capability determining element for determining different capabilities of each of different devices connected through one or more networks. The different capabilities include communication capabilities and manageability capabilities. The processor-based capability determining element is further for classifying the different devices according to capability maturity rankings supported by the different capabilities to provide maturity-based capability classifications for the different devices. The capability maturity rankings are based on capability maturity criteria. The system also includes a controller for dynamically managing operations of the different devices in accordance with the maturity-based capability classifications.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to managing an Internet of Things collection having different capabilities.

In an embodiment, an approach is provided to manage different types of devices and/or sensors (hereinafter collectively referred to as "devices") by creating a Device Capability Model. The Device Capability Model can advantageously work with devices that implement multiple different standards and manage such devices.

In an embodiment, smart device discovery is coupled with a policy driven classification system that creates a Capability Maturity Model of all connected devices. The capabilities describe characteristics such as connectivity (e.g., continuous/as-needed), manageability, security, data retrieval, services, and so forth.

Our Capability Maturity Model can include one or more connection protocols, one or more management protocols, one or more authentication requirements (credentials, certificate, public key, and so forth), one or more data access methods, one or more data model representations, one or more available Application Programming Interfaces (APIs), one or more allowable actions, and so forth.

The Capability Maturity Model categorizes and ranks devices based on the maturity of the devices to be managed.

The Capability Maturity Model also creates a consistent management abstraction on top of multiple device specific characteristics.

Figure 1:
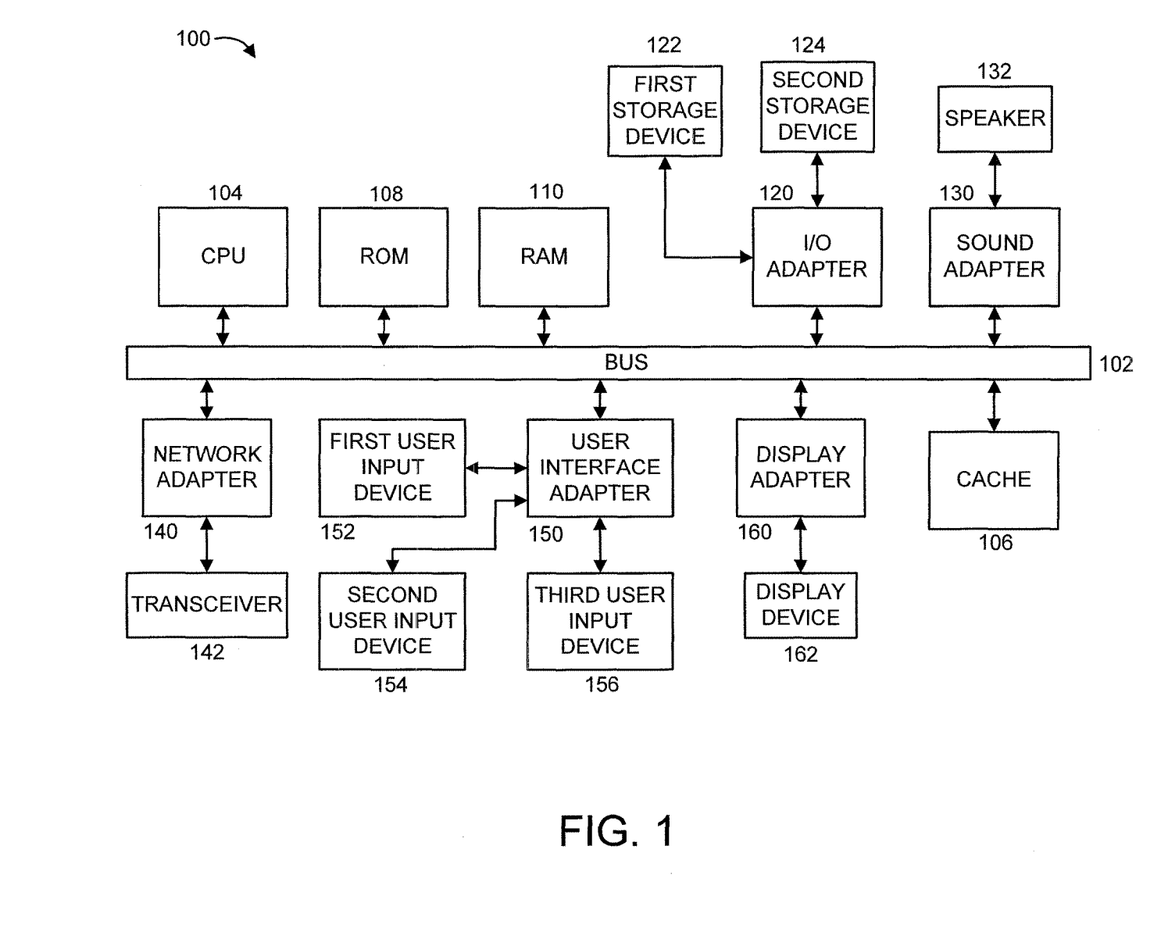
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
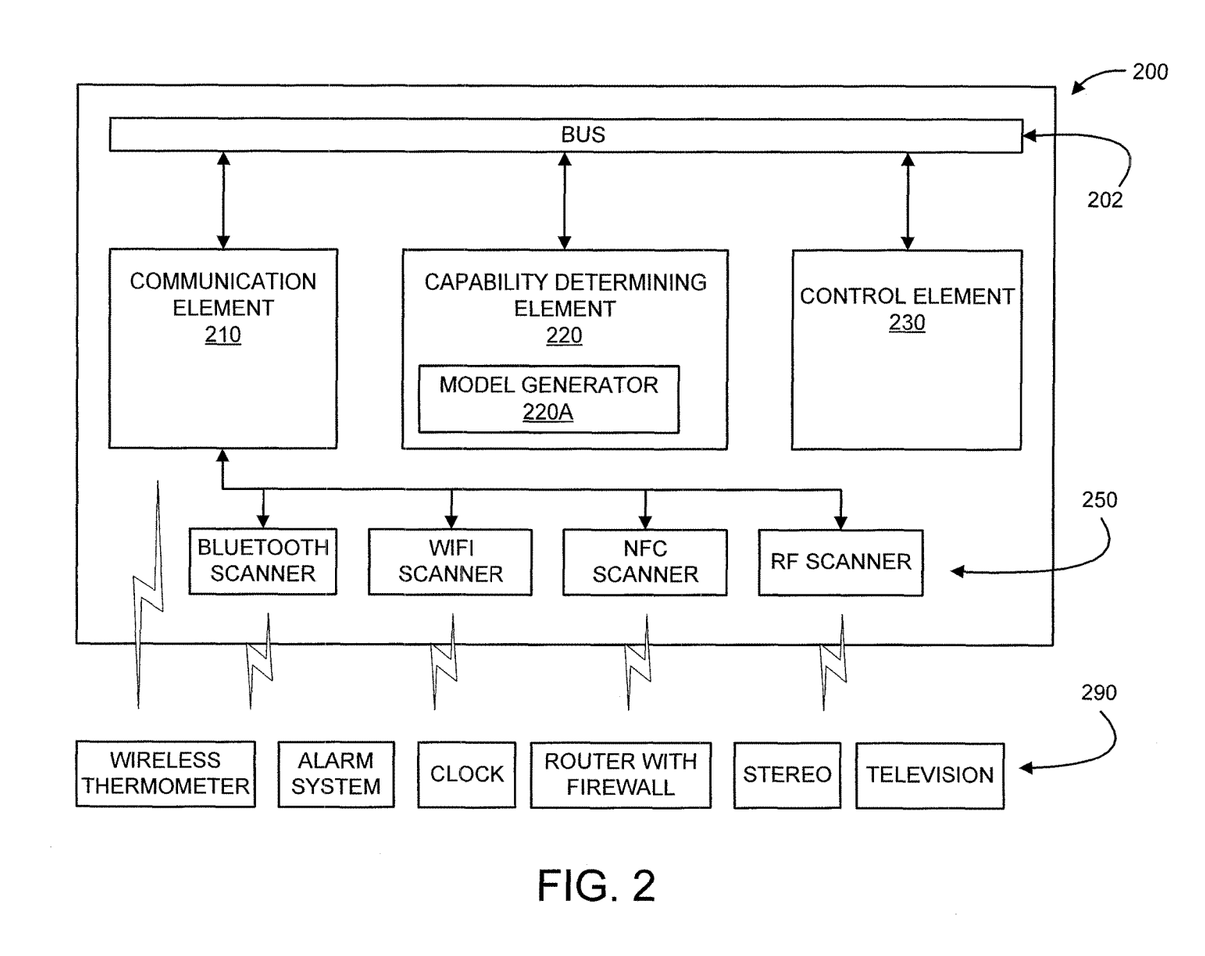
FIG. 2 shows an exemplary system 200 for learning intended user actions utilizing speech and gesture recognition, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
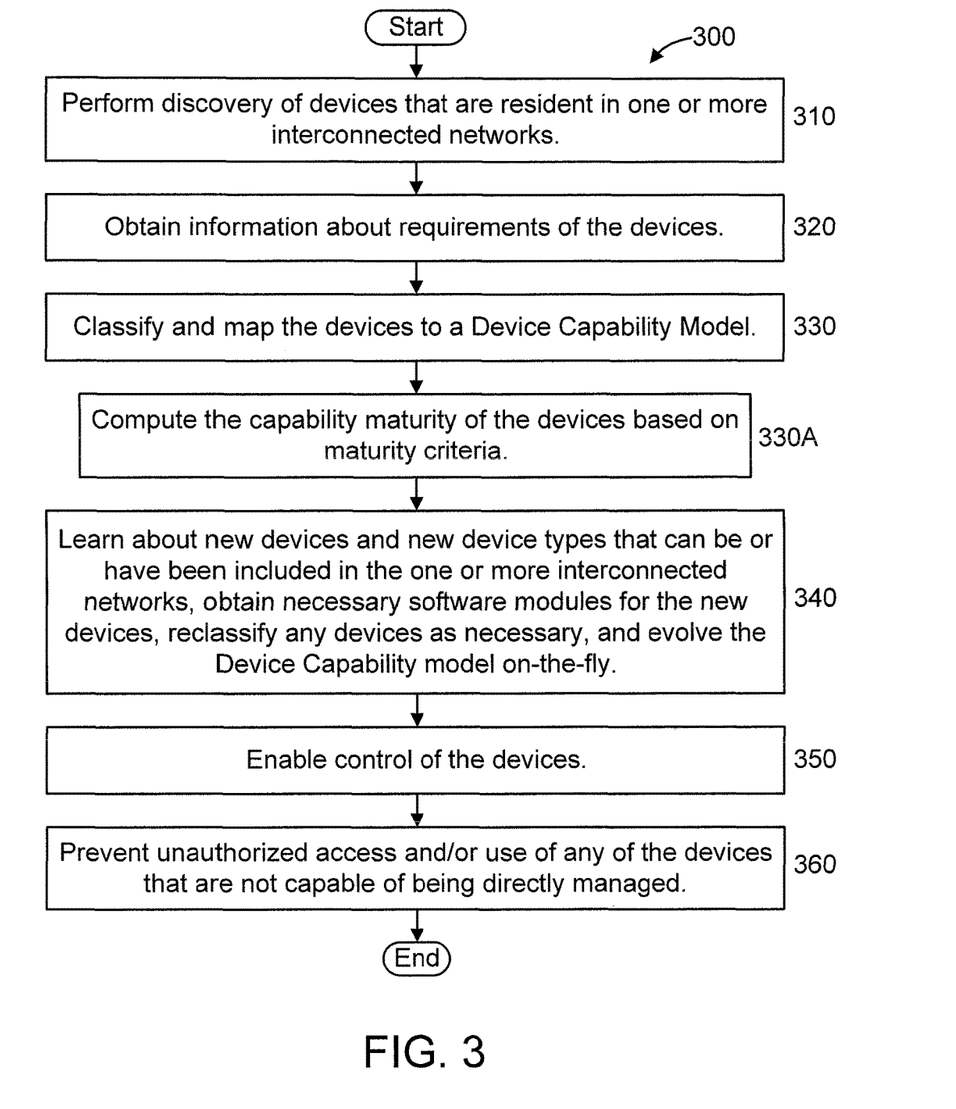
FIG. 3 shows an exemplary method 300 for learning intended user actions utilizing speech and gesture recognition, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for dynamically managing different devices and communications there between based on classification and maturity, in accordance with an embodiment of the present principles.

The system 200 includes a communication element 210, a capability determining element 220, and a control element 230.

The system 200 can further include a set of scanners 250. In the embodiment of FIG. 2, the set of scanners 250 include a Bluetooth scanner, a WiFi scanner, a Near Field Communication (NFC) scanner, and a Radio Frequency (RD) scanner. Of course, other types of scanners can also be included in the set of scanners 250, while maintaining the spirit of the present principles. The set of scanners 250 are used to initially detect a set of devices 290 resident in one or more interconnected networks (e.g., the Internet of Things). The set of devices 290 can be detected by using a communication protocol that is common to a given scanner in the set 250 and a given device in the set 290. If course, other detection approaches and hardware can also be used, while maintaining the spirit of the present principles. The set of devices 290 can include any type of device/sensor/thing found in an environment that includes one or more interconnected networks (e.g., Internet of Things). Exemplary devices 290 include but are not limited to, thermometers, routers, clocks, phones, faxes, printers, light bulbs, garage door operating systems, refrigerators, stereos, televisions, media players and/or recorders, and so forth. Some of these devices are shown in FIG. 2.

The communication element 210, under the control of the capability determination element 220, communicates with the devices in the set 290 to extract information from the devices relating to capabilities of the devices in the set 290. That is, the capability determination element 220 interfaces with the communication element 210 in order for the communication element 210 to extract certain types of information that can be used by the capability determination element 220 to determine the specific capabilities of the devices in the set 290. To that end, a device in set 290 can be polled to determine its capabilities or, from an identifier of the device 290 that is extracted by the communication element 210, its (the device's) type and model can be determined and used by the capability determination element 220 to determine the capabilities of the device (e.g., from a table or listing of capabilities for that device type and model, where multiple tables or listing for multiple devices can be maintained and updated as needed by the capability determination element 220). The communication element 210 can include a Bluetooth transceiver, a WiFi transceiver, a NFC transceiver, and a Radio Frequency transceiver. Of course, other types of devices can also be used, depending upon the communication protocols expected to be used by the devices in the set 290. Moreover, in an embodiment, the communication element 210 can obtain device capability information from sources other than the devices themselves such as, for example, from a manufacturer's website, and so forth.

The capability determination element 220 includes a device capability model generator 220A. The capability determination element 220 processes information extracted by the communication element 210 to determine the specific capabilities of the devices in set 290. A Device Capability Model is generated by the device capability model generator 220A based on the determined capabilities. In an embodiment, the Device Capability Model can include capability maturity rankings (also referred to herein as "maturity rankings" in short), which are determined using capability maturity criteria (also referred to herein as "maturity criteria" in short) in to order to rank the capabilities of the devices in the set 290. The maturity criteria can include, but are not limited to: connectivity criteria, security (e.g., credentials) criteria, configuration access criteria, intrusion detection criteria, controllability/manageability (hereinafter "any of controllability or manageability) criteria, and so forth. In an embodiment, the maturity rankings corresponds to a respective degree of a given capability. Thus, regarding controllability criteria, the maturity rankings can indicate and/or otherwise represent various degrees of controllability such as limited controllability, intermediate controllability, or full controllability as examples. Moreover, the levels of controllability can be specified in the model in a more specific manner. For example, in the case of a thermostat, the specific capabilities of being able to measure temperature, and be remotely turned on or off, and so forth, can be specified in the model. In this way, a capability, and the degrees and ways in which the capability can be exploited, can be ascertained from the Device Capability Model. The maturity rankings can be implemented numerically (e.g., using a number scale, e.g., 1 to 10, 1 to 100, etc.), using alphabets (e.g., A to Z), or can be represented by the number of capabilities (e.g., an absolute value of the overall number of capabilities) provided by a given device. Moreover, specific ranking values (e.g., alphanumeric characters) can be combined and/or otherwise associated with the specific capabilities from which such values are determined.

The control element 230 (also referred to herein as "controller" in short) is used to control the devices in the set 290. Such control can be in the form of control signals and/or commands, setting or adjusting the configurations of operations and/or functions performed by the devices in the set 290, and/or any other known type of control that can be imposed as readily appreciated by one of ordinary skill in the art. Several examples involving different types of control that can be imposed by the control element 230 are described herein below for the sake of illustration, and are not intended to be limiting in any way regarding the types and amount of control capable of being imposed on the devices in the set 290.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

FIG. 3 shows an exemplary method 300 for dynamically managing different devices and communications there between based on classification and maturity, in accordance with an embodiment of the present principles.

At step 310, perform discovery of devices that are resident in one or more interconnected networks.

Exemplary network types and/or communication protocols can involve, but are not limited to, Ethernet, Bluetooth, WiFi, Radio Frequency (RF), Radio Frequency Identification (RFID), Near Field Communication (NFC), Web Services Distributed Management (WSDM), Simple Network Management Protocol (SNMP), Wireless Local Area Network (WLAN) protocols (e.g., 802.11), infrared, and so forth. Of course, the preceding network types and network communication protocols are exemplary and, thus, the present principles can also be readily applied to other network types and communication protocols given the teachings of the present principles provided herein, while maintaining the spirit of the present principles.

In an embodiment, multiple scanners can be employed to scan different network types to detect the devices. In an embodiment, discovery using connectivity can involve, for example, using a WiFi scanner to find WiFi enabled devices, using a Bluetooth scanner to find Bluetooth enabled devices, using an Ethernet network scanner (e.g., but not limited to, Nmap®) for network connected devices, using RFID scan frequencies for RFID sensors. Of course, other approaches and devices for detection can also be used in accordance with the teachings of the present principles, while maintaining the spirit of the present principles.

At step 320, obtain information about requirements of the devices (hereinafter also referred to as "requirements information") which can include, but is not limited to, connectivity requirements, manageability requirements, security requirements, and so forth. In an embodiment, the requirements information can be obtained from the devices themselves through communications with the devices, via communication element 210.

At step 330, classify and map the devices to a Device Capability Model. An example Device Capability Model is shown in TABLE 1, in accordance with an embodiment of the present principles. In an embodiment, a Device Capability Model in accordance with the present principles can include, but is not limited to, specific device capabilities, device capability types, generic device capability usages, and specific device capability examples, for each of the devices. Of course, other types of information can also be included in the Device Capability Model, as readily determined by one of ordinary skill in the art given the teachings of the present principles provided herein, while maintaining the spirit of the present principles.

In an embodiment, step 330 includes step 330A.

At step 330A, compute the capability maturity of the devices based on maturity criteria. The maturity criteria can include, but is not limited to, availability of connectivity, degree of manageability (e.g., limited manageability, intermediate manageability, full manageability) of the devices, ease of manageability of the devices, and so forth.

In an embodiment, the capability maturity is computed as weighted average of the following device capabilities: (1) device connectivity is enabled; (2) device allows secure communication (e.g., credentials); (3) device configuration is enabled (allows read/write settings); and (4) device allows control to perform actions and allow upgrades.

Thus, the classification of the devices will involve associating the devices with their capabilities as well as basing and/or otherwise ranking such classifications on the capability maturity of the devices. In this way, the device capabilities and the maturity rankings of such capabilities can be readily determined, for example, from the Device Capability Model, which can also be interchangeably referred to as a Device Capability Maturity Model.

At step 340, learn about new devices and new device types that can be or have been included in the one or more interconnected networks, obtain necessary software modules for the new devices, reclassify any devices as necessary, and evolve the Device Capability Model on-the-fly. In an embodiment, step 340 can involve discovering new devices, obtaining information (specifications, operating manuals, software, firmware, etc.) on new devices or new device types from the devices themselves upon discovery, or from other sources (e.g., the website of the manufacturer of the device, etc.).

At step 350, enable control of the devices (capable of being controlled/managed). In an embodiment, the management control is enabled through one or more communications with the devices, and can involve direct control (issuing a command to the device to take some action) or indirect control (issuing a command that causes a particular device to control another device). The preceding control examples are merely illustrative and, thus, any type of control can be utilized in accordance with the teachings of the present principles, while maintaining the spirit of the present principles.

At step 360, prevent unauthorized access and/or use of any of the devices that are not capable of being directly managed. In an embodiment, step 360 can involve, but is not limited to, implementing network intrusion detection and prevention techniques to prevent unauthorized access and/or use of such devices. Thus, while certain devices can be detected and deemed uncontrollable for the purposes of the present principles, nonetheless, actions can be taken to prevent their unauthorized access and/or use.

TABLE 1 shows an exemplary Device Capability Model, in accordance with an embodiment of the present principles. Of course, a Device Capability Model in accordance with the present principles is not limited to the information shown in TABLE 1 and, thus, other types of information can also be included therein, as readily appreciated by one of ordinary skill in the art given the teachings of the present principles provided herein, while maintaining the spirit of the present principles.

TABLE 1

| Capability | Type | Usage | Examples |
| --- | --- | --- | --- |
| Function(s) | Core | Core ability of the device | Camera: ability to take pictures. Thermometer: ability to measure temperature. Thermostat: ability to control HVAC settings. |
| Computational | Compute | Does the device have computational ability | Thermometer: No. Programmable thermostat: Yes. |
| Connectivity enabled | Connectivity | Ability to connect to a network | |
| Connection mode | Connectivity | Continuous connectivity or intermittent, or as-needed | |
| Connection protocol | Connectivity | Ability to communicate using a given protocol | RFID, WIFI, Bluetooth, DECT, etc. |
| Who am I? | Identification | Uniquely identify the device in a domain | RFID tag, MAC address, IP address, Bluetooth name, etc. |
| Credentials | Authentication/security | Secure login to device for accessing information | |
| Read settings | Configuration | Ability to read configuration settings of the device | Read the temperature from thermostat |
| Write settings | Configuration | Ability to write or change configuration settings of the device | Set the desired temperature |
| Generate errors | Fault management | Ability to identify errors happening in the device | |
| Correct errors | Fault management | Ability to self-correct errors in the device | |
| Perform action | Control | Ability to control the device and perform actions | Reset the device, restart the device, etc. |
| Firmware upgrade | Software deployment | Ability to accept firmware updates | Firmware upgrade on a TV |

TABLE 1-continued

| Capability | Type | Usage | Examples |
|---|---|---|---|
| Application upload | Software deployment | Ability to accept applications that run on the device | |

A brief description will now be given of some of the aspects and/or features of capability maturity as employed by the present principles, in accordance with one or more embodiments of the present principles.

A description will now be given of an exemplary implementation of the present principles relating to home management, in accordance with an embodiment of the present principles.

In the exemplary implementation, a person's house is scanned for all devices resident therein, and the capabilities of remote management and power management are recorded. TABLE 2 shows exemplary devices, exemplary remote management capabilities of the devices, exemplary power management capabilities of the devices, and exemplary maturity rankings for the remote management and power management capabilities of the devices, in accordance with an embodiment of the present principles.

TABLE 2

| Device | Remote Management | Power Management |
|---|---|---|
| Thermostat | 802.11, Maturity = 10 | Modes: heat/air conditioning/vacation, Maturity = 10 |
| Television | Bluetooth 4.0, Maturity = 7 | On/Off, Maturity = 5 |
| Stereo | Bluetooth 2.0, Maturity = 5 | On/Off, Maturity = 5 |
| Light bulbs | RFID (read only), Maturity = 2 | Manual switch, Maturity = 0 |

Thus, from TABLE 2, it can be seen that a path can be executed (implemented) for going on vacation where: via 802.11, a signal is sent to the thermostat to go into vacation mode; via Bluetooth, a signal is sent to the television and stereo to turn off; while the light bulbs cannot be remotely manipulated (controlled) automatically, a listing is sent to a user of turned off lights (from RFID) and the user can then manually power the lights off.

In the example of TABLE 2, the range (scale) used for the maturity rankings is 0-10. We now elaborate on the maturity rankings for the example of TABLE 2. The television uses the latest Bluetooth standard (currently V4.0), which allows a lot of "remote management" capabilities, notably more "remote management" capabilities than are possible for Bluetooth V2.0. However, there is less you can do with Bluetooth than wireless so the Bluetooth devices, namely the television and stereo, received lower scores (rankings) of 7 and 5, respectively, for remote management, as compared to a score of 10 for the 802.11 enabled thermostat. Both Bluetooth devices (television and stereo) only let you do a basic power-on/power-off "power management" capability, thus both warranting a score of 5 for power management versus a 10 for power management for the thermostat, since the thermostat provides a whole range of power options. The light bulbs on the other hand are pretty dumb. Since their configurations can be read, they were assigned a remote management score of 2. However, since the power to the light bulbs cannot be manipulated remotely and only manually, the light bulbs were assigned a power management score of 0. The preceding examples are for illustrative purposes and depend on the implementation and important of a given capability in a given setting.

A description will now be given of additional scenarios relating to home management, in accordance with one or more embodiments of the present principles.

In a first scenario relating to home management, the stereo gets a firmware upgrade that enables communication using a new Bluetooth version (e.g., upgrading from version 1 to version 2). In such a case, the capability model will be updated.

In a second scenario relating to home management, the home owner purchases a new Bluetooth speaker. In such a case, the system of the present principles will scan and classify the new Bluetooth speaker along with the existing devices, and will also verify that the required software exists in order to connect to the devices.

In a third scenario relating to home management, a new device is detected. In such a case, the homeowner is alerted, and provided the opportunity to decide whether or not to classify the new device as well as whether to allow the new device access to the existing home network(s).

A description will now be given of an exemplary implementation of the present principles relating to store management, in accordance with an embodiment of the present principles.

In the store management scenario, everything in the store has a barcode that can be potentially scanned, recorded, and classified for management in accordance with the present principles. TABLE 3 shows exemplary devices, exemplary remote management capabilities of the devices, and exemplary power management capabilities of the devices, in accordance with an embodiment of the present principles.

TABLE 3

| Device | Remote management | Power management |
|---|---|---|
| Thermostat | 802.11 | Modes: heat/AC/vacation |
| DVD Player/Recorder | Bluetooth | On/Off (emulate remote control function) |
| Blu-Ray Player/Recorder | Bluetooth | On/Off (emulate remote control function) |
| Televisions | Bluetooth | On/Off (emulate remote control function) |
| Stereo | Bluetooth | On/Off (emulate remote control function) |
| Light bulbs | RFIDs | Remotely On/Off |
| Garage systems | Security + 2.0 on 310-390 MHz | Remotely Open/Close |
| Security systems | Bluetooth | On/Off |
| Refrigerators | Bluetooth | On/Off |

A description will now be given of additional scenarios relating to home management, in accordance with one or more embodiments of the present principles.

In a first scenario relating to home management, the stereo gets a firmware upgrade that enables communication using a new Bluetooth version (e.g., upgrading from version 1 to version 2). In such a case, the capability model will be updated.

A description will now be given of additional scenarios relating to store management, in accordance with one or more embodiments of the present principles.

A first scenario relates to intrusion/detection in a store management setting.

In the first scenario, the system is equipped with an Intrusion Detection Equipment (IDE) that allows early detection of a $3^{rd}$ party intrusion.

A third party device(s) attempts to manipulate the coupon system in Target®. The IDE can detect the attempt at manipulation as an outside intrusion and ignore its' requests, thus maintaining the integrity of Target's current store network.

The IDE first actively detects the intrusion of third party software, then locks down the system automatically, and provides a detailed report on the intrusion for the users' records.

Locking down the system can involve, for example, but is not limited to, sending a remote shut down in an extreme case scenario or just issuing a "stop broadcasting" signal over, e.g., Bluetooth, for the hand held scanners and through, e.g., 802.11, for the cash register; upon which both set of devices will be set to "read-only" mode to prevent the third party from altering the integrity of the system.

In a second scenario relating to store management, a particular device could be used to manage not only the thermostat of the store but also the lights, the security systems, and so forth. Knowing the store opening and closing schedule, the particular device could automatically set the lights, security systems, and so forth to a pre-determined state. This will help the store cut expenses on utility bills. At closing time, the particular device could send a "shut down" signal to all devices equipped with, e.g., Bluetooth (see list above in TABLE 3) and through other communication channels (e.g., 802.11, RFIDs, WiFi, etc.), bring such devices to a power off state (of course, this would not involve the security systems in most cases).

In a third scenario relating to store management, a particular device is enabled with the functionality to be paired with any electronic item(s) (televisions, Blu-ray players, refrigerators, garage systems, security devices, and so forth) to its designated Bluetooth or other dedicated communication channels to allow management of the electronic items(s). This allows for smart connectivity, remote management and integration of those electronic items amongst themselves and with other devices on the system.

An example relating to the preceding third scenario will now be described, in accordance with an embodiment of the present principles. In this example, the managers of a produce store could have refrigerators that not only detect the levels of ethylene gas which is an odorless gas that hastens the ripening process of fruits and vegetables, but also react to the levels by adjusting temperature, adjusting air flow within the section, order more produce and/or send immediate notifications to the managers. They could also have the capability to allow for manual, individual adjustment of these settings. They could also use the business' wireless connection to provide suggestions and links to the managers regarding shelf life and produce information.

The preceding scenarios and examples are but a very small sampling of the myriad of scenarios and examples to which the present principles can be applied given the teachings of the present principles provided herein, while maintaining the spirit of the present principles.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
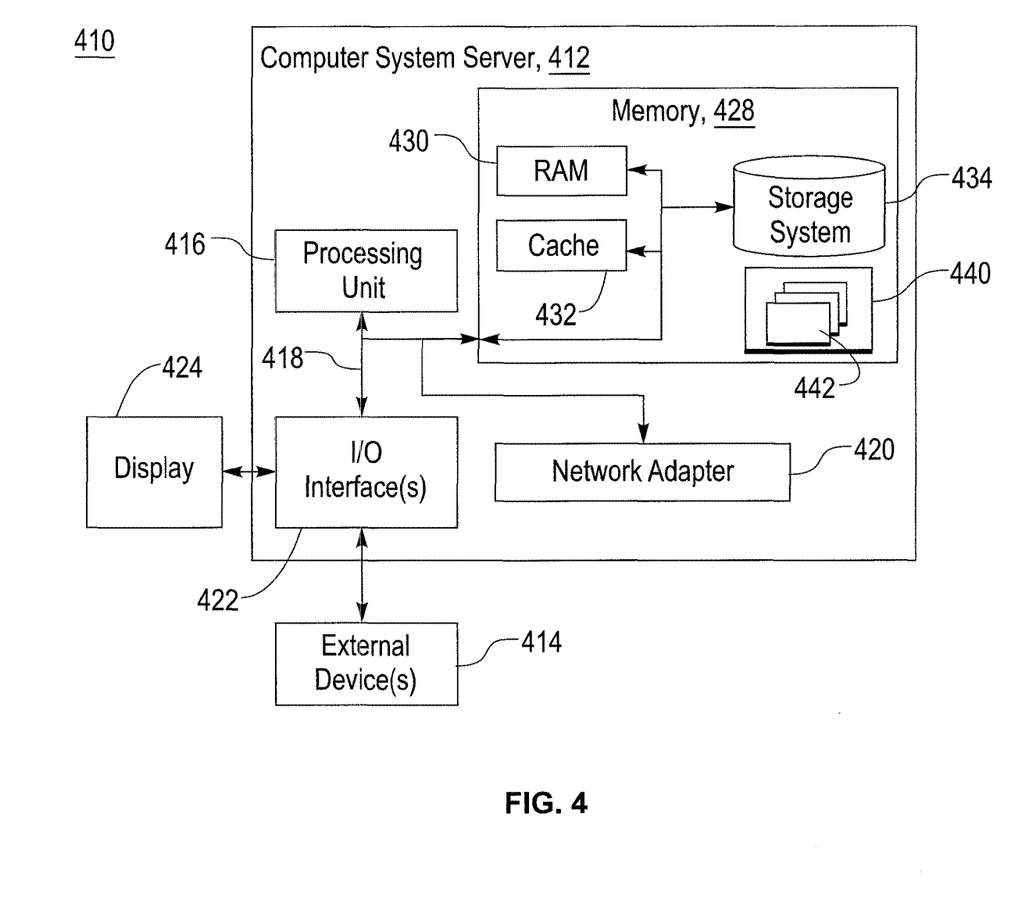
FIG. 4 shows an exemplary cloud computing node 410, in accordance with an embodiment of the present principles.

Referring now to FIG. 4, a schematic of an example of a cloud computing node 410 is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
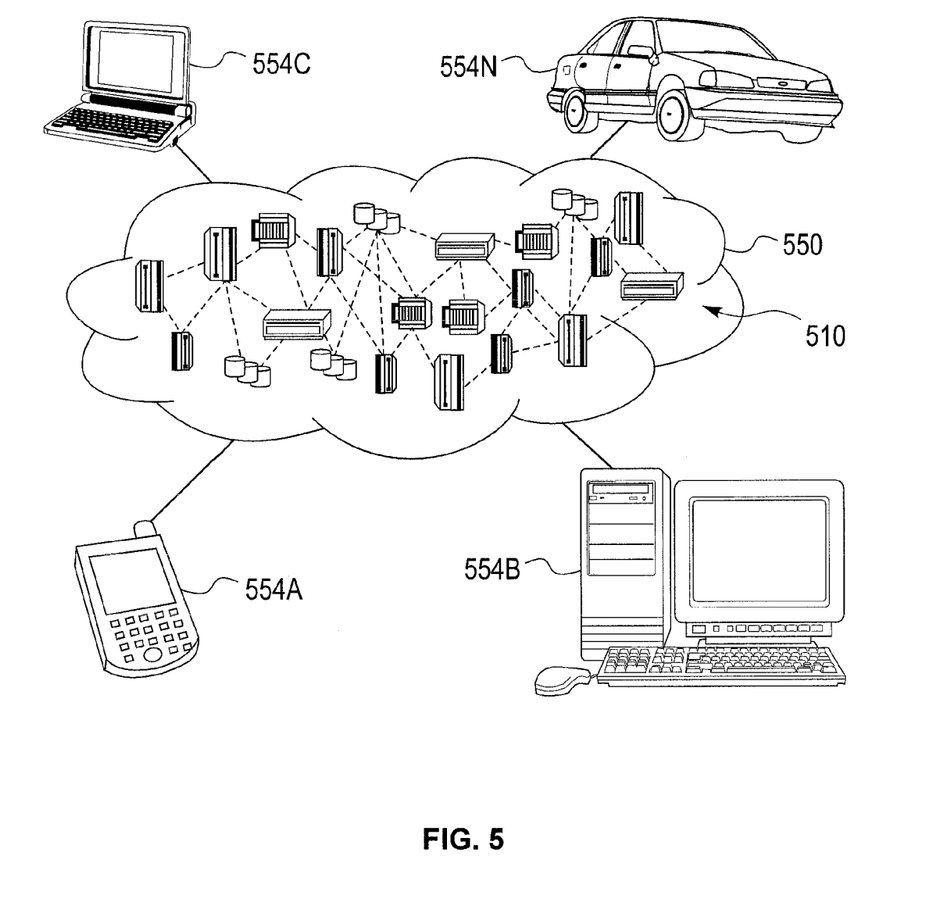
FIG. 5 shows an exemplary cloud computing environment 550, in accordance with an embodiment of the present principles.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
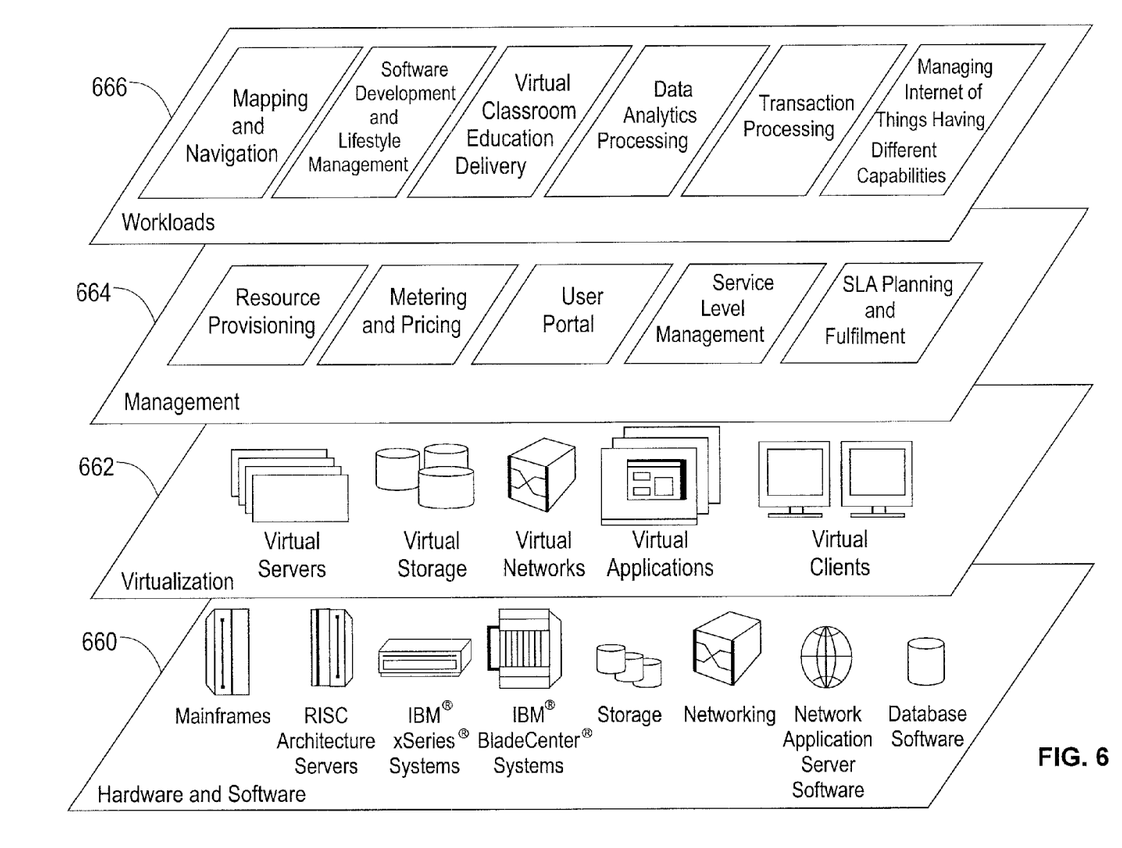
FIG. 6 shows exemplary abstraction model layers, in accordance with an embodiment of the present principles.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing Internet of Things having different capabilities.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    determining, by a processor-based capability determining element, different capabilities of each of different devices connected through one or more networks, the different capabilities including communication capabilities, security capabilities, and manageability capabilities;
    classifying, by the processor-based capability determining element, the different devices according to capability maturity rankings supported by the different capabilities to provide maturity-based capability classifications for the different devices, the capability maturity rankings (i) based on capability maturity criteria and (ii) representing various degrees of controllability of various user operable features inherent in the different devices; and
    dynamically managing, by a controller, operations of the different devices in accordance with the maturity-based capability classifications.

2. The method of claim 1, further comprising automatically discovering the different devices using a plurality of scanners, each of the plurality of scanners configured to perform scanning using a respective different ones of a plurality of communication protocols.

3. The method of claim 2, wherein the method automatically enables and utilizes a given one of the plurality of communication protocols that has a most amount of capabilities relative to other ones of the plurality of communication protocols and that is common to the different devices.

4. The method of claim 3, wherein for at least some of the different devices, the most given one of the plurality of communication protocols is one of many available communication protocols capable of being enabled and utilized.

5. The method of claim 1, wherein the capability maturity criteria comprises connectivity criteria, security criteria, configuration access criteria, intrusion detection criteria, and controllability criteria.

6. The method of claim 5, wherein the controllability criteria relates to accessibility of device specific capabilities.

7. The method of claim 5, wherein the connectivity criteria comprises communication protocols that include Ethernet, Bluetooth, WiFi, Radio Frequency, Radio Frequency Identification, Near Field Communication, Web Services Distributed Management, Simple Network Management Protocol, Wireless Local Area Network protocols, and infrared.

8. The method of claim 1, wherein said classifying step comprises generating a device capability model that specifies specific device capabilities, device capability types, generic device capability usages, and specific device capability usage examples for each of the different devices.

9. The method of claim 8, wherein said dynamically managing step comprises enabling at least one of the different devices to control one or more other ones of the different devices, based on a capability specified in the device capability model.

10. The method of claim 1, wherein each of the capability maturity rankings is computed as a respective weighted average of device capabilities comprising (i) enabled device connectivity, (ii) secure communication, (iii) enabled device configuration for both read and write settings, and (iv) controllable and upgradeable, and wherein the capability maturity rankings are displayed, by a display device, to a user in a form of a table that indicates remote management capabilities of the different devices, exemplary power management capabilities of the different devices, and the maturity rankings for remote management and power management capabilities of the different devices.

11. The method of claim 1, wherein said dynamically executing step comprises executing an action path that comprises a plurality of actions that are executed by respective ones of the different devices in descending order of the corresponding capability maturity rankings used to classify the respective ones of the different devices.

12. The method of claim 1, wherein the capability maturity rankings indicate various degrees of controllability selected from the group consisting of a limited controllability, an intermediate controllability, and a full controllability.

13. A computer program product for device management, the computer program product comprising a non-transitory computer readable storage medium having program instructions embodied therewith, the program instructions executable by a computer to cause the computer to perform a method comprising:
    determining, by a processor-based capability determining element, different capabilities of each of different devices connected through one or more networks, the different capabilities including communication capabilities, security capabilities, and manageability capabilities;
    classifying, by the processor-based capability determining element, the different devices according to capability maturity rankings supported by the different capabilities to provide maturity-based capability classifications for the different devices, the capability maturity rankings based on (i) capability maturity criteria and (ii) representing various degrees of controllability of various user operable features inherent in the different devices; and
    dynamically managing, by a controller, operations of the different devices in accordance with the maturity-based capability classifications.

14. A system, comprising:
    a processor-based capability determining element for
        determining different capabilities of each of different devices connected through one or more networks, the different capabilities including communication capabilities, security capabilities, and manageability capabilities, and
        classifying the different devices according to capability maturity rankings supported by the different capabilities to provide maturity-based capability classifications for the different devices, the capability maturity rankings based on (i) capability maturity criteria and (ii) representing various degrees of controllability of various user operable features inherent in the different devices; and
    a controller for dynamically managing operations of the different devices in accordance with the maturity-based capability classifications.

15. The system of claim 14, further comprising a plurality of scanners for automatically discovering the different devices by using different ones of a plurality of communication protocols.

16. The system of claim 15, wherein the controller automatically enables and utilizes a given one of the plurality of communication protocols that has a most amount of capabilities relative to other ones of the plurality of communication protocols and that is common to the different devices.

17. The system of claim 16, wherein for at least some of the different devices, the most given one of the plurality of communication protocols is one of many available communication protocols capable of being enabled and utilized.

18. The system of claim 14, further comprising at least one communication element for obtaining, from at least some of the devices, information from which the different capabilities of each of the different devices can be determined by the processor-based capability determination element.

19. The system of claim 14, wherein the capability maturity criteria comprises connectivity criteria, security criteria, configuration access criteria, intrusion detection criteria, and controllability criteria.

20. The system of claim 14, wherein the processor-based capability determining element classifies the different capabilities by generating a device capability model that specifies specific device capabilities, device capability types, generic device capability usages, and specific device capability usage examples for each of the different devices.

* * * * *